US008646753B2

United States Patent
Ross

(10) Patent No.: US 8,646,753 B2
(45) Date of Patent: Feb. 11, 2014

(54) SYSTEM FOR TRANSPORTING SHIPPING CONTAINERS

(76) Inventor: Roger L. Ross, Elgin, SC (US)

( * ) Notice: Subject to any disclaimer, the term of this patent is extended or adjusted under 35 U.S.C. 154(b) by 97 days.

(21) Appl. No.: 13/480,785

(22) Filed: May 25, 2012

(65) Prior Publication Data

US 2012/0298935 A1 Nov. 29, 2012

Related U.S. Application Data

(60) Provisional application No. 61/490,815, filed on May 27, 2011.

(51) Int. Cl.
*B62B 3/06* (2006.01)

(52) U.S. Cl.
USPC .......................................... 254/2 R; 254/5 R

(58) Field of Classification Search
None
See application file for complete search history.

(56) References Cited

U.S. PATENT DOCUMENTS

| | | | |
|---|---|---|---|
| 2,831,588 A * | 4/1958 | Seed | 414/341 |
| 2,876,016 A | 3/1959 | McCellan | |
| 3,105,703 A | 10/1963 | Rittenhouse | |
| 3,188,042 A | 6/1965 | Watters | |
| 3,259,400 A | 7/1966 | Tantlinger et al. | |
| 3,473,678 A * | 10/1969 | Levitt et al. | 414/347 |
| 3,522,895 A | 8/1970 | Stokes | |
| 3,817,570 A | 6/1974 | Connerat | |
| 4,047,748 A | 9/1977 | Whaley et al. | |
| 4,089,435 A * | 5/1978 | Corompt | 414/411 |
| 4,413,943 A | 11/1983 | Liljestrom | |
| 5,040,826 A | 8/1991 | Lovell | |
| 6,174,126 B1 | 1/2001 | Zanzig et al. | |
| 8,465,246 B2 * | 6/2013 | Duell et al. | 414/494 |
| 2009/0267320 A1 | 10/2009 | Phillips | |
| 2010/0215466 A1 | 8/2010 | Cline | |

* cited by examiner

*Primary Examiner* — Lee D Wilson
*Assistant Examiner* — Shantese McDonald
(74) *Attorney, Agent, or Firm* — Michael A. Mann; Nexsen Pruet, LLC

(57) ABSTRACT

A system for transporting shipping containers using a tractor with a first support assembly attached to its fifth wheel, and a wheeled, second support assembly. Both the front and rear assemblies include cargo-container-engaging vertical frames that are raised and lowered by pivoting main cylinders. As the main cylinders raise the vertical frames and the container to which the vertical frames are secured to, two locking arms telescope with the vertical arm to hold the raised container in position. The second support assembly may be self-propelled for maneuvering into position with respect to the container or may be manually pulling short distances with by hand.

20 Claims, 12 Drawing Sheets

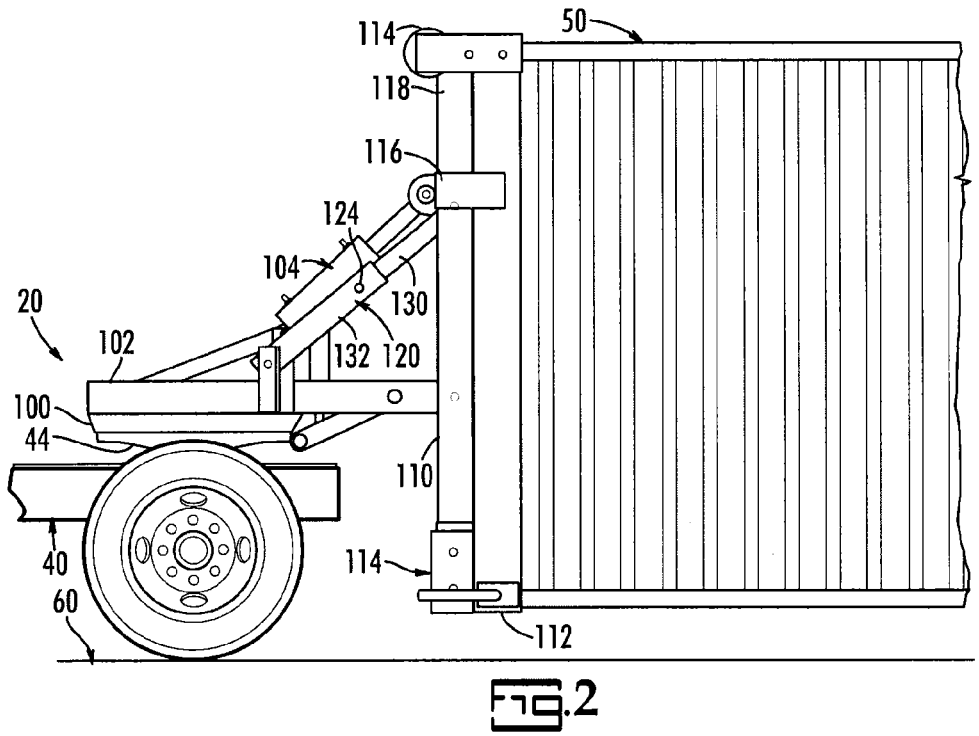
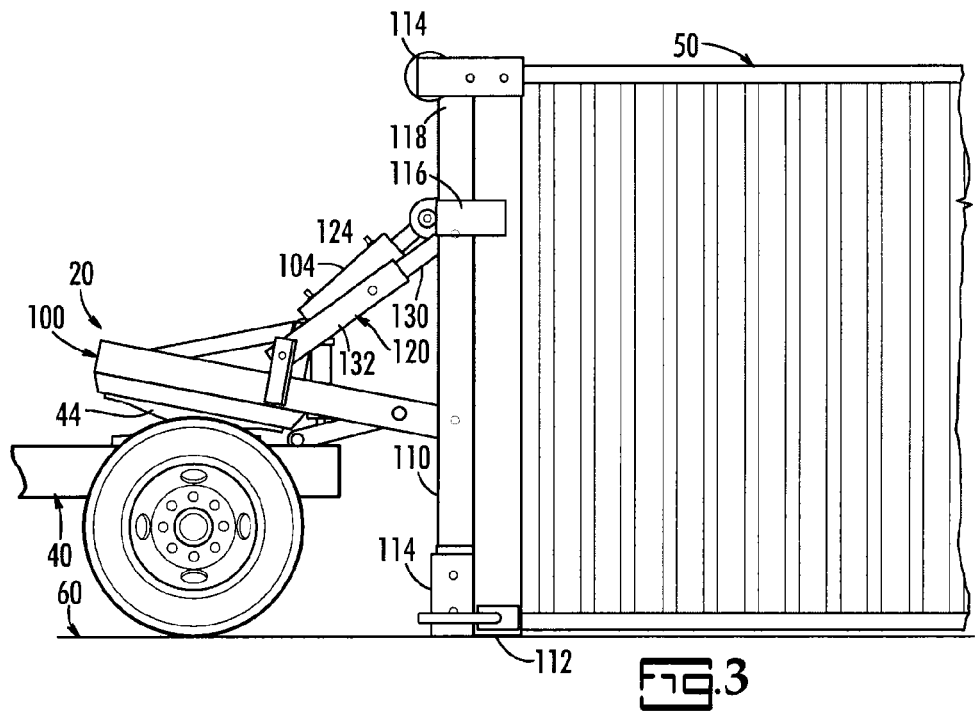

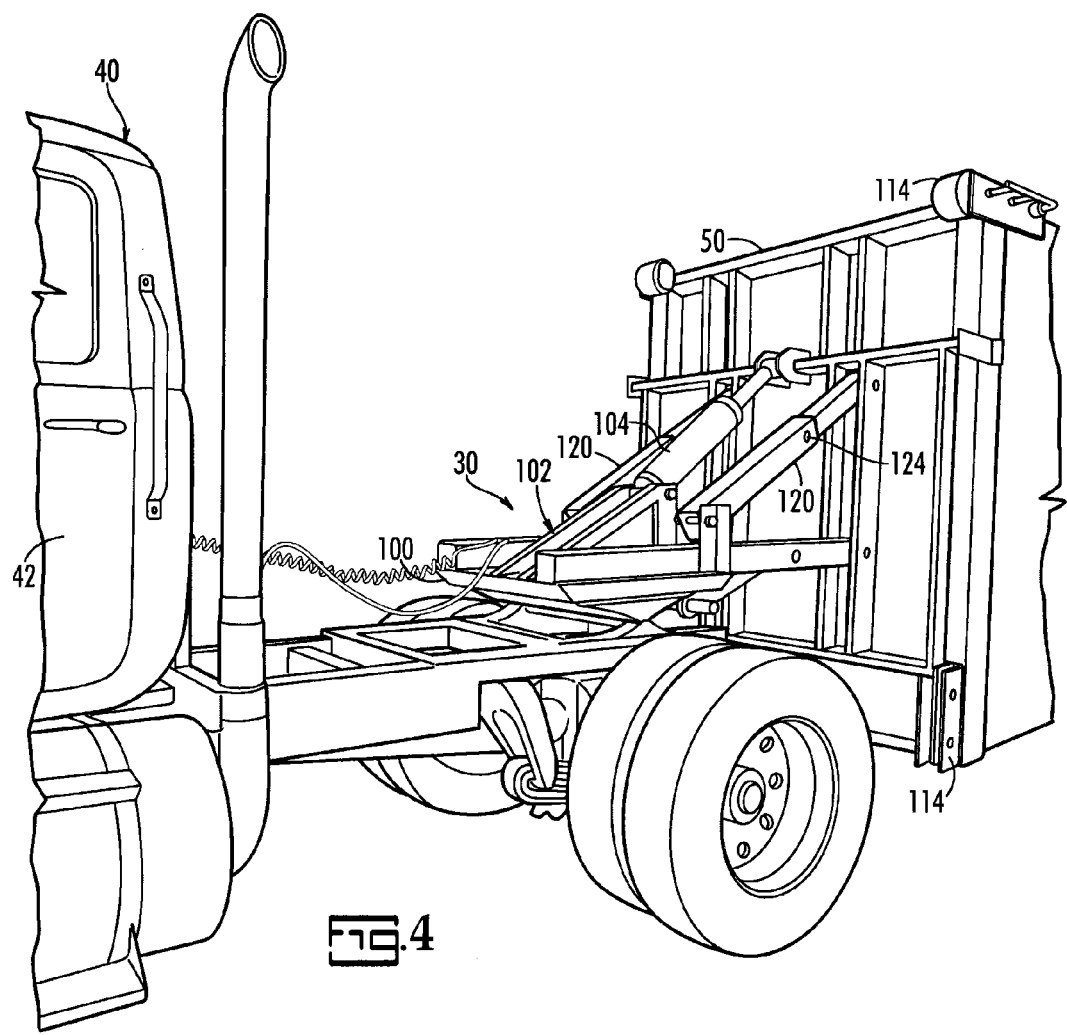

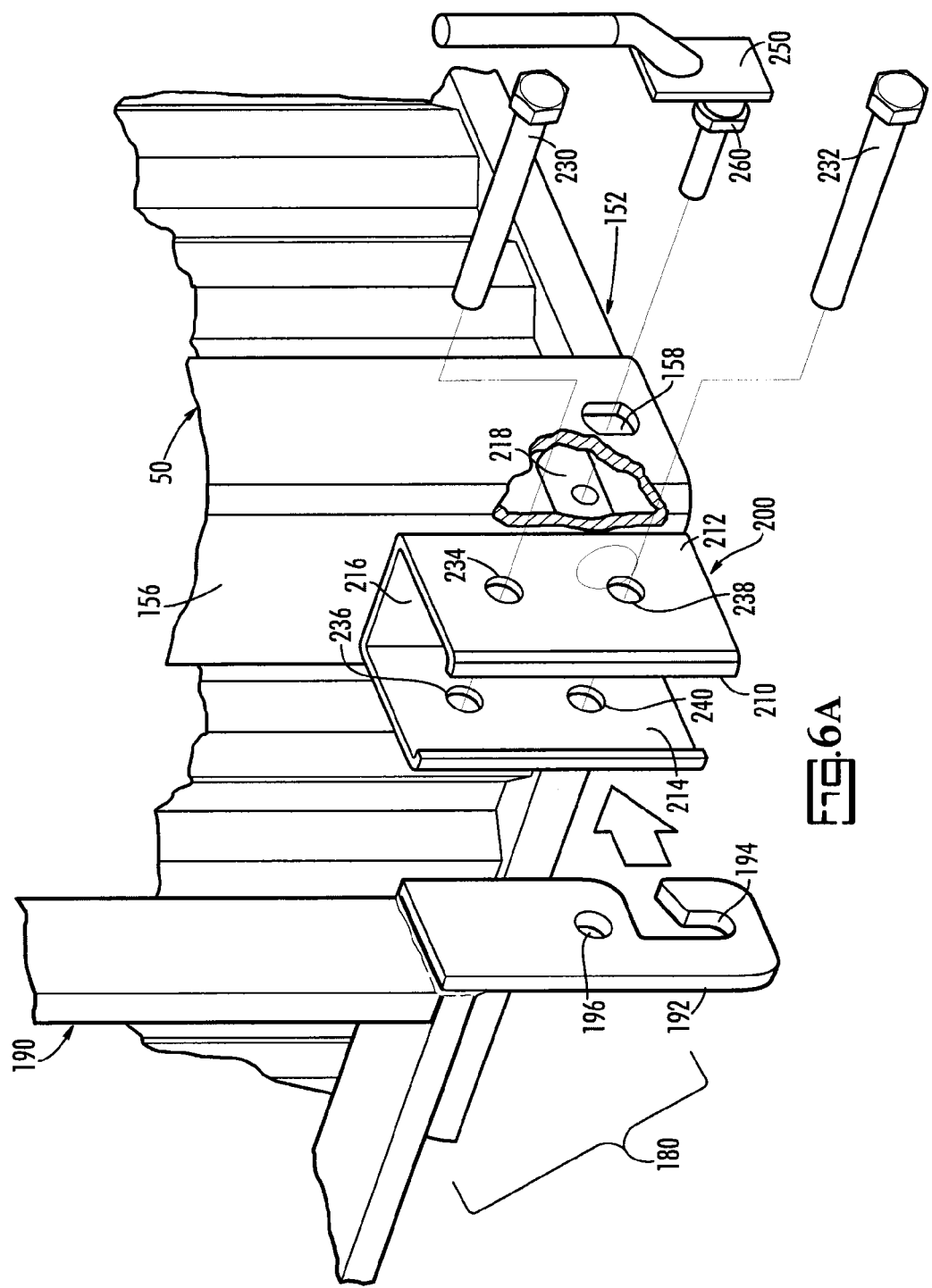

SYSTEM FOR TRANSPORTING SHIPPING CONTAINERS

PRIORITY CLAIM

Priority benefit is claimed to U.S. Provisional patent application Ser. No. 61/490,815, filed May 27, 2011, which is incorporated herein in its entirety by reference.

BACKGROUND OF THE INVENTION

Substantial tonnage of freight moves throughout the world in shipping containers. Shipping containers are standard, rectangular storage devices with strong corners that are liftable by cranes from ships at port, from docks and from distribution centers for placement on railroad flatcars and flatbed trailers. Companies that receive frequent shipments of goods by ship often park trailers at dockside for use in moving shipping containers as soon as a ship carrying the containers is off-loaded. Shipping container users make a significant investment in cranes, trailers, and flatcars and the time to put these assets in place prior to container movement.

SUMMARY OF THE INVENTION

Briefly recited, the present invention is a system for transporting shipping containers. According to one embodiment of this system, a tractor is provided with a first support assembly for use in combination with a wheeled second support assembly, which assemblies cooperate to secure a shipping container between the tractor and second support assembly to lift it from its resting position on the ground, and to haul it to a distant location.

The first support assembly includes a horizontal frame, a vertical frame with locking assemblies, a main cylinder, and locking arms. The horizontal frame attaches to the fifth wheel of a tractor. The vertical frame engages the front end of the cargo container and secures to its four corners using the locking assemblies. The main cylinder pivotally secures the horizontal frame to the vertical frame. After locking the cargo container to the vertical frame, the vertical frame is raised above the road surface using the main cylinder. The main cylinder is a hydraulic cylinder, carried by the tractor, extends to lift the front end of the container off the ground.

The second support assembly also has a horizontal frame, a vertical frame with locking assemblies on each corner, and a pivoting main cylinder and locking arms. The rear assembly secures to the rear end of the container using the locking assemblies, and then lifts it when the main cylinder extends from its retracted position. Locking arms hold the raised container for transport.

The present invention has two alternate rear support assemblies, one is self-propelled and the other moves by manual effort or by a small motor. The self-propelled support assembly includes wheels on a double axel as well as the attendant features required for the second support assembly to operate as a trailer, such as rear brakes and both brake lights and tail lights. However, it contains an engine separate from that of the tractor that supplies its needs for compressed air to operate the pneumatic cylinders for locking devices and hydraulic pressure to provide lifting, motive and steering power, through operation of its main cylinder and other hydraulic cylinders as will be described.

The present system and method has numerous advantages. It eliminates the need for both a separate trailer and a crane to lift a shipping container. It allows greater payloads without exceeding over-the-road weight limits; it reduces the need for overweight permits. It eliminates the need for a loading dock at trailer height at the receiving destination.

The present invention is then a system for transporting a shipping container, comprising a first support assembly having a horizontal frame, a vertical frame, a main cylinder pivotally connect to the horizontal frame and the vertical frame. The cylinder is adapted to move between a retracted position and an extended position to move the vertical frame with respect to the horizontal frame. The system includes locking assemblies carried by the vertical frame for securing one end of the container to the vertical frame, wheels supporting and connected to the horizontal frame, and an engine supported by the horizontal frame and operationally connected with the wheels and the main cylinder so that the engine can rotate the wheels and thereby move the first support assembly and can cause the main cylinder to move from its retracted position to its extended position. The system includes controls carried by the horizontal frame connected to the engine, the wheels and the main cylinder so that a user can control movement of the first support assembly. The system includes a second support assembly having a horizontal frame, a vertical frame, a main cylinder pivotally connect to the horizontal frame and the vertical frame, and adapted to move between a retracted position and an extended position. The main cylinder moves the vertical frame with respect to the horizontal frame by moving between its retracted position and its extended position, being operationally connected with the engine of the first support assembly so that the engine can move the main cylinder of the second support assembly. The second support assembly includes locking assemblies carried by the vertical frame for securing the second end of the container, and wheels supporting the horizontal frame and operationally connected to that frame. The locking assemblies of the first support assembly secure the first end of the container and the locking assemblies of the second support assembly secure the second end of the container. The engine moves the main cylinders of the first and second support assemblies from their retracted positions to their extended positions to lift the container, and, when the engine then causes the wheels of the first support assembly to rotate, both first and second support assemblies move the container.

The first support assembly may be a tractor. The first support assembly may include drive wheels carried by its horizontal frame and movable between an engaged position against the wheels and a disengaged position away from the wheels, the engine being in operative connection with the drive wheels and thereby causing the drive wheels to move between their engaged position and their disengaged position and to rotate so that the wheels rotate to move the container. The first support assembly may also include a castor wheel carried by its horizontal frame and that is pivotable about a vertical axis. Castor wheel has a ground-engaging position and an elevated position. The engine operates the castor wheel to cause it to pivot left and right and to move between its ground-engaging and its elevated positions. Controls enable a user to steer the first support assembly by moving the castor wheel to its ground-engaging position and pivoting the castor wheel left and right.

The first and second support assemblies further comprise at least one telescoping locking arm pivotally connected between the horizontal frame and the vertical frame of the first and second support assemblies, respectively. The locking arm telescopes as the main cylinder of the first or second support assembly moves from the retracted position to the extended position. The locking arm may be locked in the extended position.

In the present system, the vertical frame of the first and second support assemblies carries first and second guides dimensioned to be wider than the ends of the container so that, when the vertical frame of the first (or second) support assembly is being positioned for attachment to the end of the container, the first and second guides of the first (or second) support assembly guide the end of the container into position with respect to the first support assembly.

In the present system, the locking assemblies of the first and second support assemblies further comprise four locks each, one set of locking assemblies will secure the vertical frame of the first support assembly to each corner of the first end of the container. Locking assemblies may be pneumatic locks or mechanical or a combination of each in one set.

In the present system, the engine of the tractor operates an air pump to provide compressed air for the air cylinders that control the locking mechanisms and hydraulic pressure for moving the main (lifting) cylinders from the retracted positions to the extended positions for lifting the container.

In the present system, the support assembly has drive wheels carried by the horizontal frame and movable between an engaged position against the ground-engaging wheels and a disengaged position away from the ground-engaging wheels. The engine operating through its air pump and an air cylinder cause the drive wheels to move between the engaged position and the disengaged position and to rotate so that the ground engaging wheels rotate to move the support assembly into position with respect to the container.

These and other features and their advantages will be apparent to those skilled in the art of transportation equipment and requirements from a careful reading of the Detailed Description of Preferred Embodiments, accompanied by the following drawings.

BRIEF DESCRIPTION OF THE DRAWINGS

In the figures,

FIG. 2 is a side view of a front assembly and part of a shipping container supported by the assembly, according to an embodiment of the present invention;

FIG. 3 is a side view of the front assembly and shipping container of FIG. 2 with the shipping container lowered to the surface, according to an embodiment of the present invention;

FIG. 4 is a perspective view of a portion of a tractor with the first support assembly holding the front of a shipping container, according to an embodiment of the present invention;

FIG. 6A is an exploded perspective view of the locking assembly of the front and rear support assemblies showing the locking assembly fastened to the corner of a shipping container, according to an embodiment of the present invention;

DETAILED DESCRIPTION OF EMBODIMENTS OF THE INVENTION

The present system relates to hauling shipping containers. Shipping containers are standardized containers for intermodal shipping. However, the present invention can be readily adapted to work with any type of container that is sufficiently rigid to serve as a trailer when supported from its opposing ends.

While shipping containers are standardized, there are several different standards for shipping containers. An example of one international standard for a type of shipping container is found at ISC 52, which is incorporated herein in its entirety by reference. For convenience, the term "container" by itself will refer to a "shipping container" that is, in particular, a large rigid, metal box, without wheels or a suspension system, and used for containing a quantity of freight for transport by truck, by railroad, or by ship.

Figure 1:
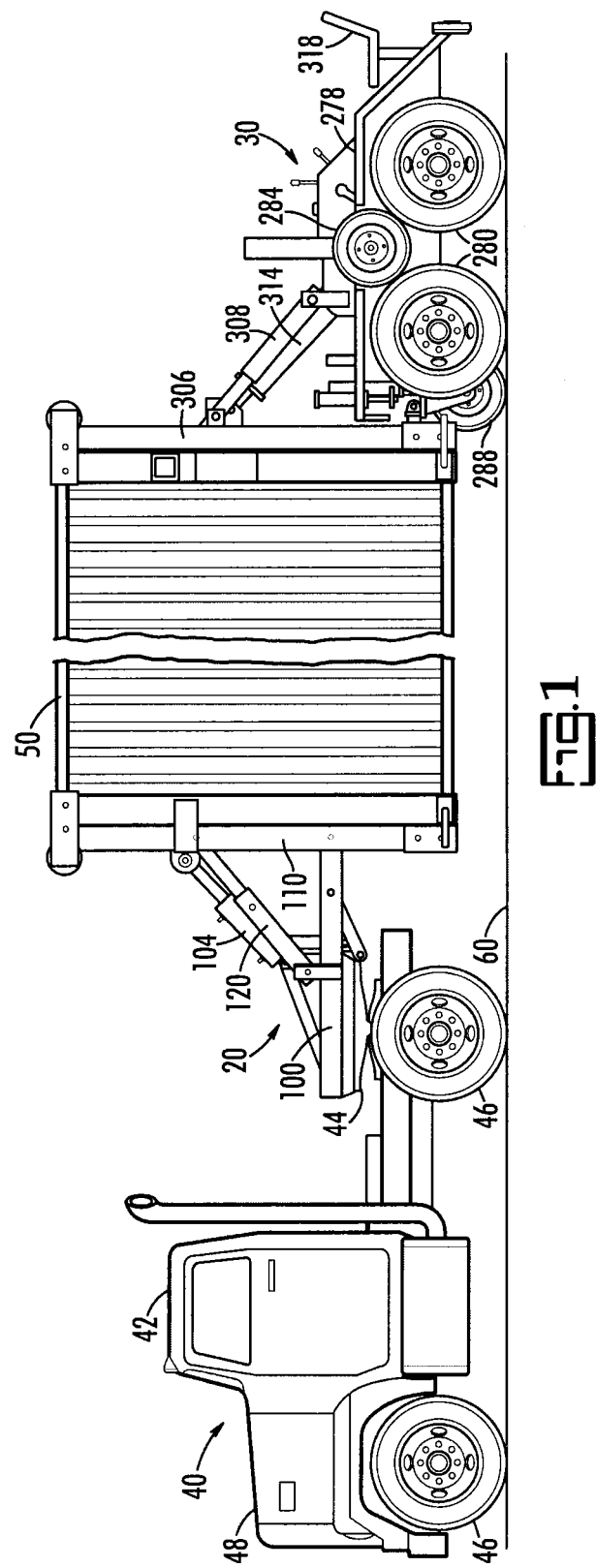
FIG. 1 is a side view of a tractor with a front support system and a mobile rear support system supporting a shipping container, according to an embodiment of the present invention.

Referring now to FIG. 1, the present system includes two major components, a front or first support assembly 20 and a rear or second support assembly 30. The first and second support assemblies, 20, 30 cooperate with each other to lift the opposing first and second ends of a shipping container 50, respectively. At least one of first or second support assemblies must be self-propelled—a tractor 40, for example, may comprise much of first support assembly 20—to haul container 50 without a trailer from the point of pick up to a destination. Tractor 40 includes wheels 46 and an engine 48 and an air pump (not shown) powered by the engine to provide compressed air. Tractor 40 is a typical tractor, including wheels, an engine and air pump, except for specific additions as will be described below. The destination may be close by, such as from dockside to a staging area at the same port facility, or to a much more distant location. The container in effect becomes its own trailer, supporting itself and its contents between first and second support assemblies 20, 30.

Self-propelled and non-self-propelled embodiments of second support assembly 30 may be used with a given first support assembly 20. A self-propelled second support assembly 30 may be used with a tractor 40, for example. In FIG. 1, second support assembly 30 is self-propelled; that is, it can also move itself and container 50 without tractor (but requires a second support unit, either self-propelled or not self-propelled, at the opposing end of that container 50 to lift that end.

The term tractor refers to a heavy-duty vehicle built for hauling loads, with a cab 42 from which a driver operates the controls of the vehicle that are in operative connection with engine 48 and wheels 46, and which includes a fifth wheel 44 mounted behind cab 42 on the tractor's frame. Engine 48 provides motive power but also drives a pump (not shown) driven to produce hydraulic pressure to power the hydraulic cylinders.

Referring now to FIGS. 2, 3 and 4, first support assembly 20, shown in side view, engages the front portion of container 50. In FIG. 2, first support assembly 20 has lifted container 50 above the surface 60 of the ground, staging area, or road, whereas, in FIG. 3, first support assembly 20 has lowered container 50 onto surface 60. FIG. 4 is a perspective front right-side view of first support assembly 20 shown lifting container 50.

First support assembly 20 includes a horizontal frame 100 carried by and secured to fifth wheel 44. Horizontal frame 100 supports a main cylinder 104, which pivotally attaches to vertical frame 110 on one end and horizontal frame 100 on the other. Main cylinder 104 has a retracted position and an extended position. Vertical frame 110 engages container 50 and secures to the bottom and top corners 118 of container 50 using locking assemblies 114, which may be mechanical locks or pneumatic or hydrulic locks or may be a combination of mechanical and pneumatic/hydraulic locks. Guides 116 carried by both sides of vertical frame 110 near its top corners 118 help to center container 50 with respect to vertical frame 110.

Pivoting frame 102 includes two telescoping, pivoting locking arms 120 on either side of main cylinder 104. Locking arms 120 pivotally attach to horizontal frame 100 at one end and vertical frame 102 at the other end. Locking arms 120 secure vertical frame 110 at the desired height after main cylinder 104 has raised vertical frame 110 (and, with it, container 50) to the desired height above surface 60. As main cylinder 104 extends from its retracted position to its extended position, locking arms 120 extend telescopically with it, that is, the inner arms 130 of locking arms 120 slide out of the outer arms 132. When main cylinder 104 moves to its retracted position from its extended position, locking arms 120 follow and container 50 lowers to surface 60. Pins 124 inserted in pivoting locking arms 120 hold inner arms 130 in that extended position with respect to outer arms 132 thereby allowing the release of the air pressure provided to main cylinder 104 so that its load transfers from main cylinder 104 to locking arms 120.

To lower container 50, main cylinder 104 first extends slightly to take up the load on static arms 120. When pins 124 are pulled from locking arms 120, main cylinder 104 retracts, and locking arms 120 follow, with inner arms 130 moving into outer arms 132. As main cylinder 104 extends and retracts, vertical frame 110 raises and lowers, respectively. Main cylinder 104 derives hydraulic pressure so it can extend from the pump carried by tractor 40.

Figure 5:
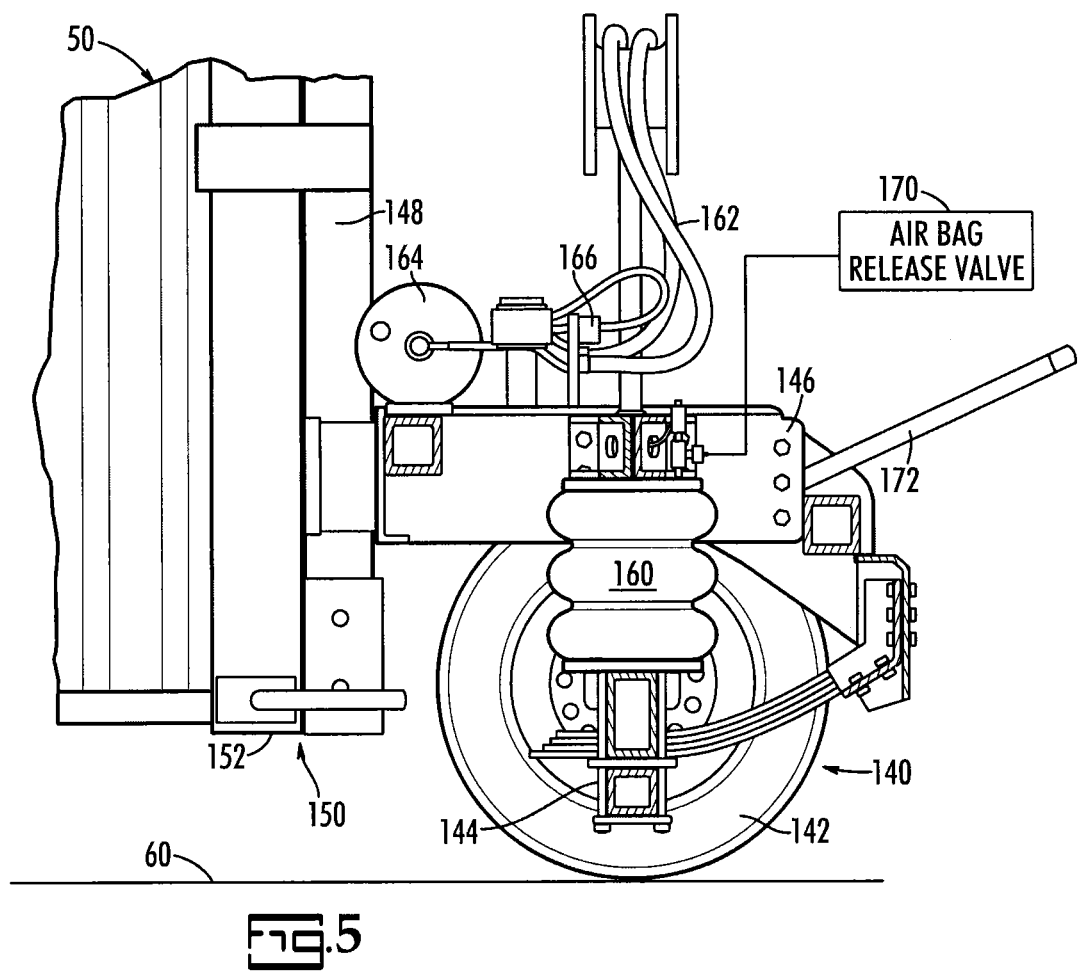
FIG. 5 is a side view of a first embodiment of a second support assembly, partially cut away, and shipping container being supported by the assembly, according to an embodiment of the present invention.

FIG. 5 is a side view of the non-self-propelled embodiment of second support assembly 30, partially cut away to show it in detail. Second support assembly 30 holds the second end of container 50 above surface 60 in FIG. 5. Unlike first support assembly 20 which includes a tractor 40 with its own wheels, second support assembly 30 includes a wheel assembly 140 operatively connected to its horizontal frame 144. Horizontal frame 144 connects to a vertical frame 148 that engages second end of container 154 and is secured to it by using locking assemblies 150. Locking assemblies 150 are similar to locking assemblies 114 that hold first end of container 50 to first support assembly 20, shown in FIG. 4.

To raise vertical frame 148, air bags 160 receive compressed air from the air pump of tractor 40. Compressed air flows through hoses 162 from the pump of tractor to an air tank 164. The compressed air from air tank 164 is distributed by a manifold 166 to both air brakes (not shown) associated with wheels 142 and to air bags 160 to raise horizontal frame 144 and, with it, vertical frame 148. Lowering vertical frame 148 requires opening an air release valve 170 to vent air from air bags 160.

A handle 172 attaches to second support assembly 30 for use in manually moving second support assembly 30 into engagement with container 50. Alternatively, second support assembly 30 may have a small electric drive motor mounted proximate to wheels 142 and a steering mechanism to assist control and reduce the effort of maneuvering assembly 30. In another embodiment, second support assembly 30 may have two pair of wheels 142 on separate axels for supporting larger or heavier containers 50.

Figure 6B:
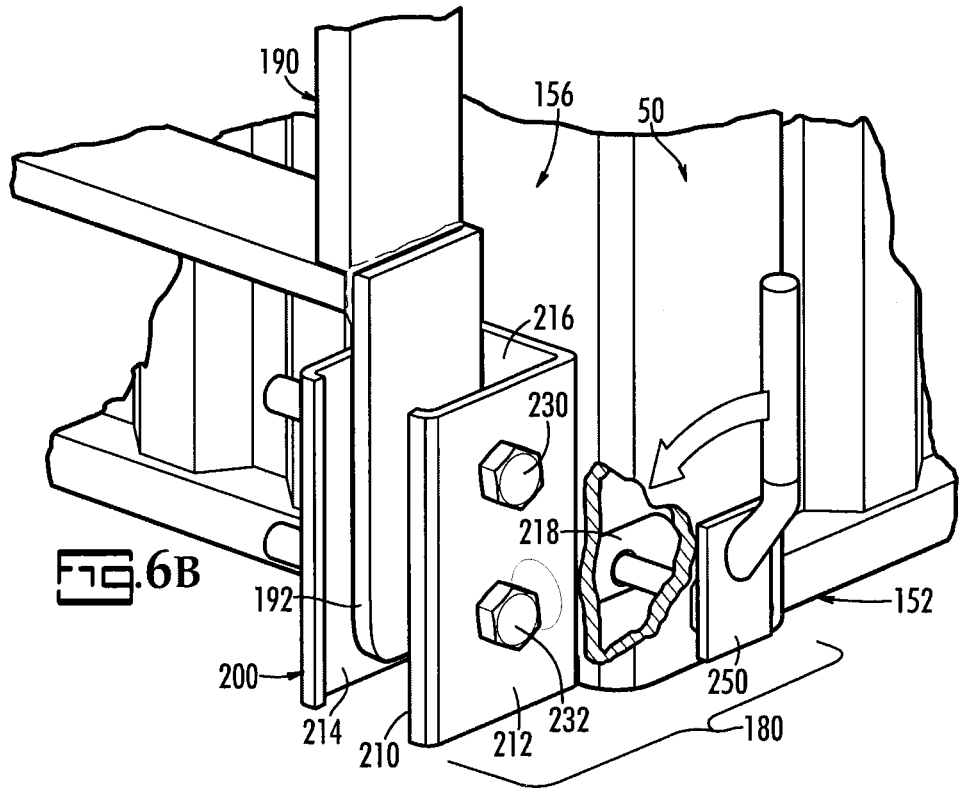
FIG. 6B is a perspective, assembled view of the locking assembly of the front and rear support assemblies of FIG. 6A, shown partially cutaway and in the unlocked position, according to an embodiment of the present invention.
Figure 6C:
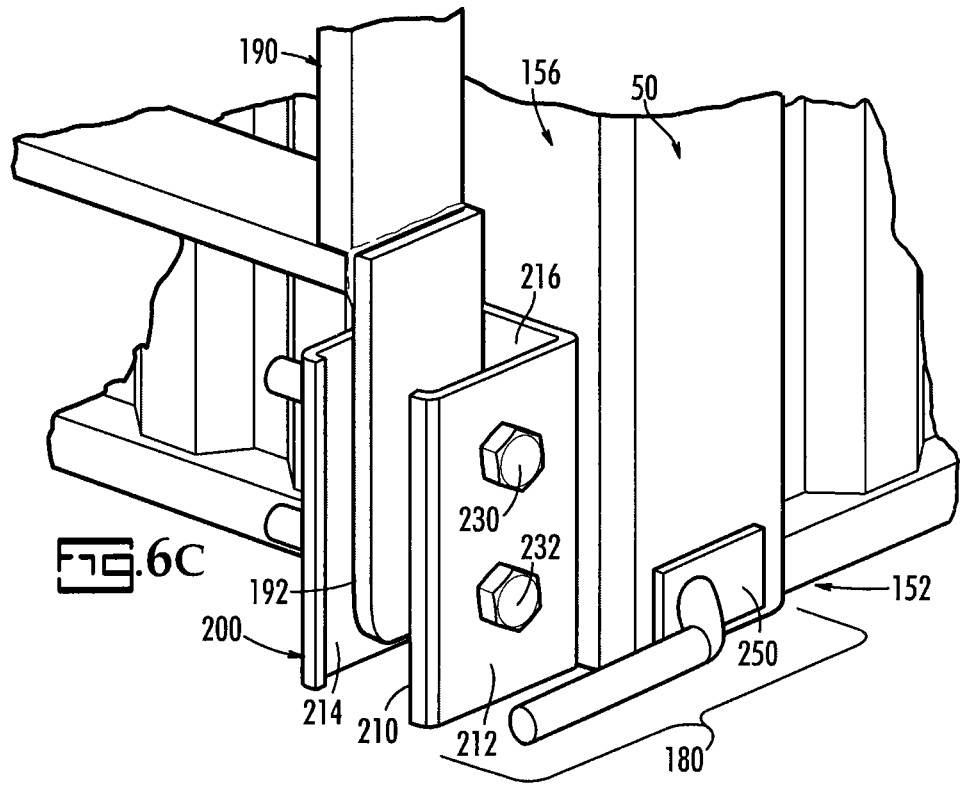
FIG. 6C is a perspective view of the attachment system of the front and rear support assemblies of FIG. 6A, shown in the locked position, according to an embodiment of the present invention.

FIGS. 6A-6C illustrate in detail a locking assembly 180, which is identical to locking assemblies 114 on lower corner 112 of container 50, briefly described above. Locking assembly 180 is next to a corner 152 of container 50. Corner 152 is defined by a pillar 156 that is partially cut away to show its interior. There is a keyed hole 158 formed in the outside surface of pillar 156.

At the bottom of vertical frame 190, which is similar to vertical frames 110 and 148, is a hook 192 with a slot 194 and a hole 196 above slot 194. A receiver 200 couples hook 192 to vertical frame 190 and pillar 156. Receiver 200 has an open front side 210, two adjacent, opposing locking sides 212, 214, and a closed back 216 that carries a heavy pin 218 with a transverse hole 220 formed in it. Heavy pin 218 and transverse hole 220 are visible through the cutaway portion of pillar 156 in FIG. 6A. Heavy pin 218 is inserted in a hole (not visible) formed in the outside surface of pillar 156 on the side adjacent to the side having keyed hole 158 and which faces vertical frame 190. Once heavy pin 218 of receiver 200 seats fully in pillar 156, hook 192 may be passed through open side 210 of receiver 200 and pinned by receiver pins 230, 232. Receiver pin 230 passes through holes 234, 238 in locking sides 212, 214 as well as well as slot 194. Receiver pin 232 passes through holes 238, 240 in locking sides 212, 214 as well as hole 196. Finally, a locking pin 250 inserts into keyed hole 160 past keyed flange 260, and is rotated a quarter turn, using its handle 262, to cause keyed flange 260 to lock locking pin 250 in pillar 156 and transverse hole 218 of heavy pin 218. Vertical frame 190 is then securely attached to pillar 156 and thus to container 50.

Figure 7:
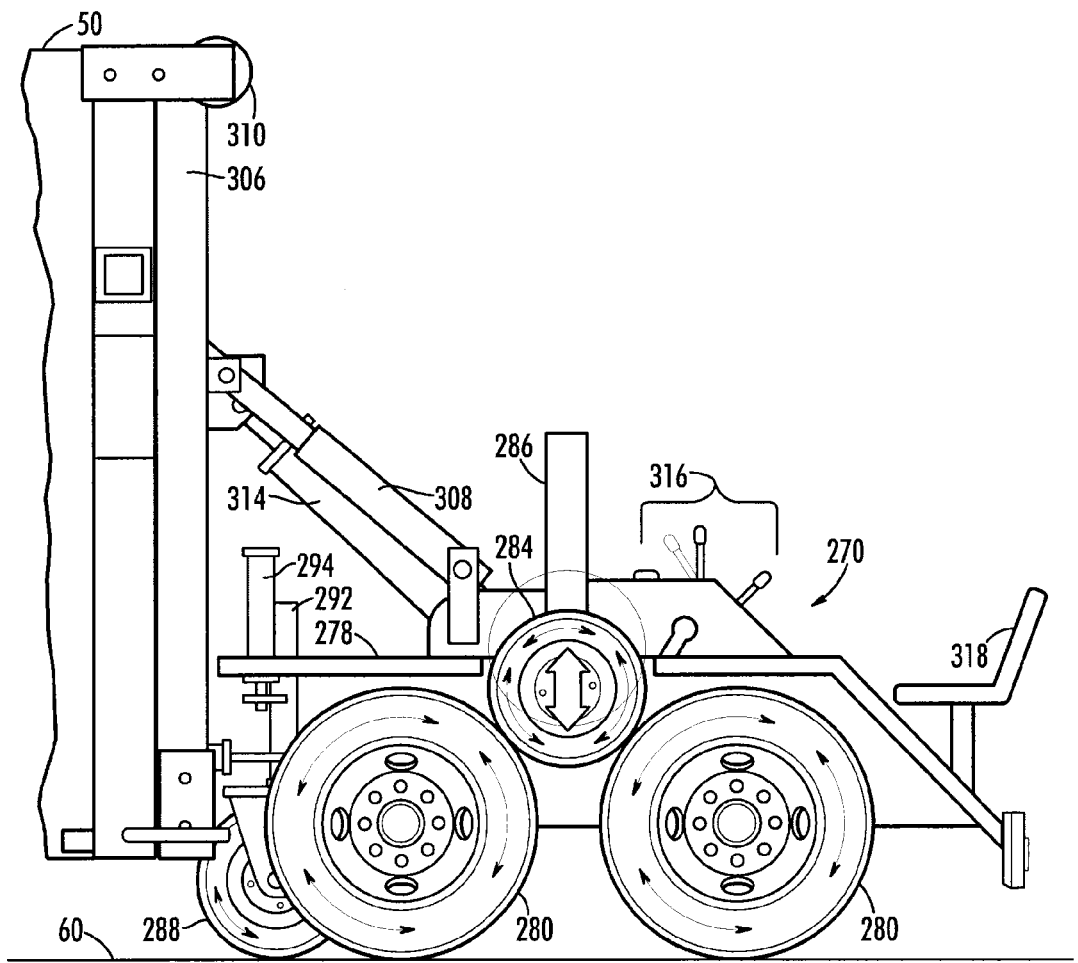
FIG. 7 is a side view of an alternative embodiment of a mobile second support assembly, showing the drive wheel in engagement with the support assembly wheels and the direction of motion of the drive wheels and support assembly wheels, as indicated by arrows, and the support assembly supporting the end of the shipping container above the surface, according to an embodiment of the present invention.
Figure 8:
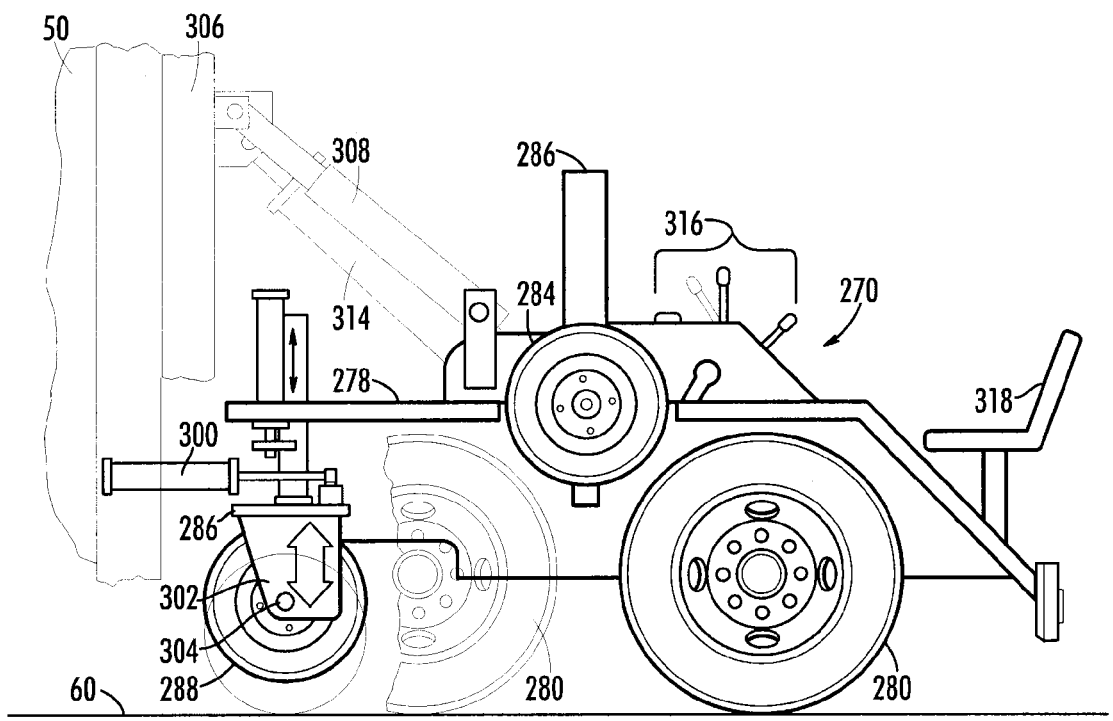
FIG. 8 is another side view of the mobile second support assembly, partially cut away to show the location of the steering castor and steering and lifting control cylinders, according to an embodiment of the present invention.
Figure 9:
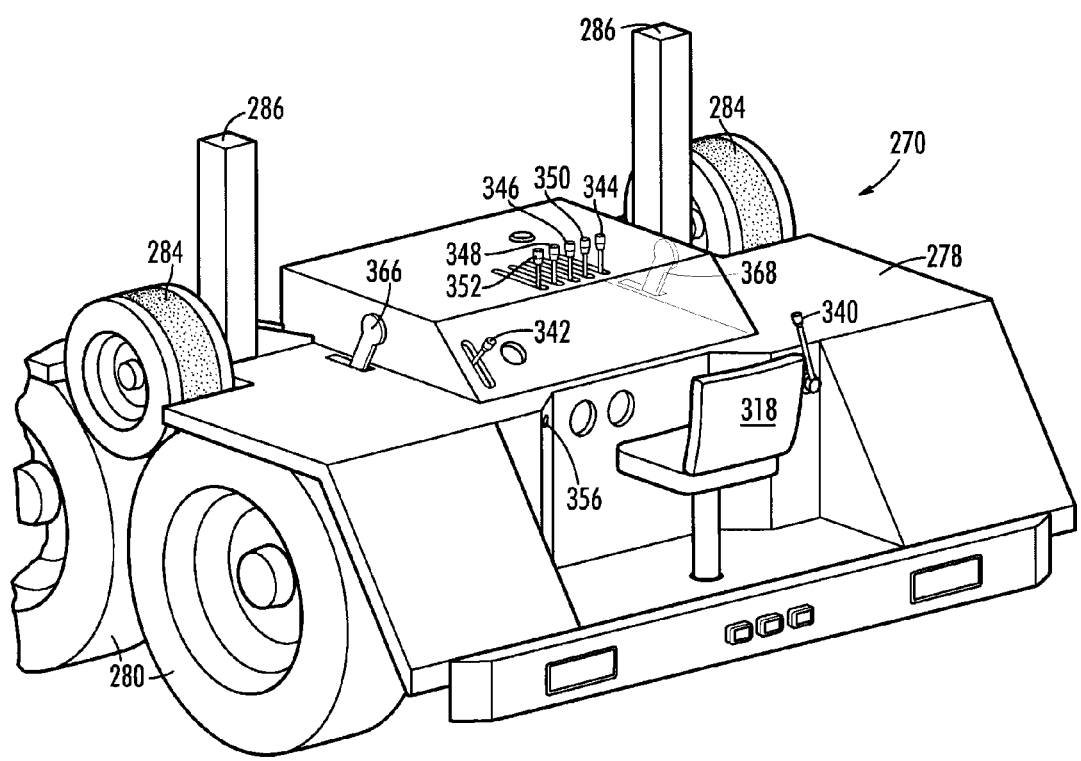
FIG. 9 is a rear perspective view of the mobile unit showing the controls, according to an embodiment of the invention.

FIGS. 7, 8 and 9 show a mobile or self-propelled second support assembly 270. Support assembly 270 is shown lifting container 50 above the surface 60 and able to move container 50. Support assembly 270 includes a frame 278 riding on two pair of wheels 280 connected to a standard double-axle configuration (not shown) typical of trailers that haul heavy loads. Wheels 280 are driven by drive wheels 284 (left drive wheel 284 is shown in FIGS. 7 and 8 and both left and right drive wheels 284 are shown in FIG. 9 but right drive wheel 284 is a mirror image of the left one in FIGS. 7 and 8).

Drive wheels 284 have an engaged position against wheels 280 (FIG. 7) and a disengaged position in which they are raised above wheels 280 (FIG. 8). When drive wheels 284 are in their engaged positions and rotated, they in turn rotate wheels 280 to move support assembly 270. Drive wheels 284 ride up and down vertical masts 286, urged by hydraulic rams (not shown in FIGS. 7-9), to disengage and engage wheels 280, respectively. FIG. 7 shows the up and down movement of drive wheels 284 in dashed lines and, when in the engaged position, their ability to rotate wheels 280. For example, counter-clockwise movement of drive wheels 284 cause clockwise movements of both wheels 280; clockwise movement of drive wheels 284 causes counter-clockwise movement of wheels 280.

Second support assembly 270 includes a castor wheel 288 for steering assembly 270. Castor wheel 288 can be rotated to the left or right about a vertical axis to steer second support assembly left or right, and it can be moved up to a elevated position or down to a surface-engaging position for steering. Castor wheel 288 moves up and down on a mast 292 when lifted by a castor cylinder 294 in a manner similar to that of mast 286 for drive wheels 284, and turns left and right by pivoting a horizontal pivot plate 296 (FIG. 8) moved by a steering cylinder 300. Pivot plate 296 attaches to axle plates 302 that straddle castor wheel and provide a bearing surface for its axle 304.

In order to grip and hold container 50, second support assembly 270 has a vertical frame 306 that engages container 50 securing it at the top with pneumatic or hydraulic locks 310 (FIG. 7; see also FIG. 4, top) and at the bottom by locking assemblies 312 (FIG. 7), both as previously described. Container 50 is lifted using main cylinder 314 that is pivotally attached at one end to frame 278 and at the other end of vertical frame 306. As main cylinder 314 extends, it lifts container 50 up from surface 274.

Second support assembly 270 includes a seat 318 for a driver and various controls 316, best seen in FIG. 9. See also FIG. 10. These various controls 316 operate an engine 320 housed within horizontal frame 278 that drives a pump 321 (also housed within frame 278) for the various cylinders of second support assembly 270, and open and close various valves to drive air into these cylinders or release air from the cylinders. When air enters one end of an air cylinder, its ram extends; when the air enters the other end and is released from the first, its arm retracts into the cylinder, as is well known. In order to simplify the drawings, FIG. 10 shows a schematic diagram of the control system of second support assembly 270.

Figure 10:
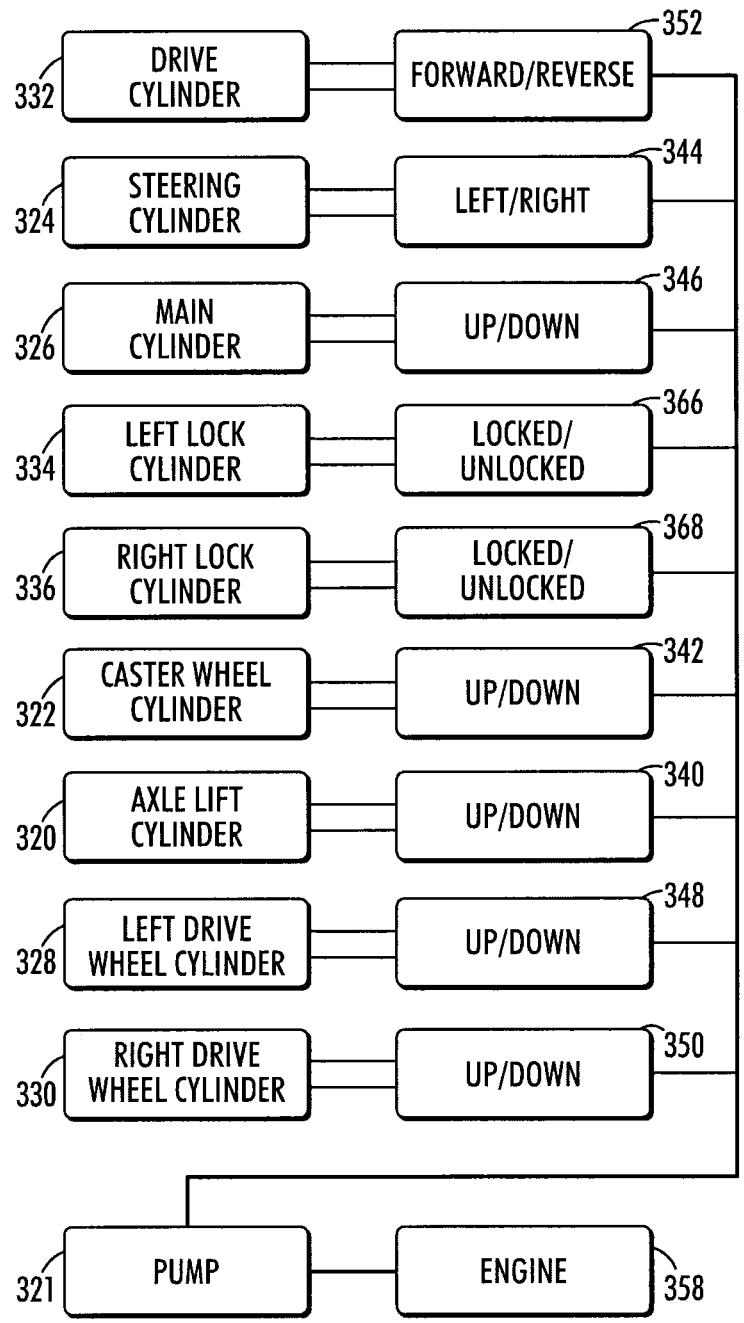
FIG. 10 is a schematic showing the main cylinders that control the present mobile rear support unit.

As seen in FIGS. 9 and 10, axle lift cylinder 320, operated by lever 340, moves rear axle up and down; castor wheel cylinder 322, operated by lever 342, moves castor wheel 288 up and down; steering cylinder 324, operated by lever 344, moves castor wheel 288 left and right; main cylinder 326, operated by lever 346 moves main cylinder 308 from its retracted to its extended position (and container 50 moves down and up, respectively); left drive wheel cylinder 328, operated by left drive wheel cylinder 348, moves left drive wheel 284 up and down; right drive wheel cylinder 330, operated by right drive wheel lever 350, moves right drive wheel 284 up and down; drive control cylinder 332, operated by drive control lever 352, moves second support assembly 270 forward and reverse; left locking assembly cylinder 334, operated by left locking assembly lever 366, locks and unlocks the left locking assembly 310; right locking assembly cylinder 336, operated by right locking assembly lever 368, locks and unlock right locking assembly 310.

An ignition switch 356 for starting and stopping engine 358, and a manual valve 360 for raising and lowering the suspension of rear support unit 270 are also on control panel 354.

Figure 11:
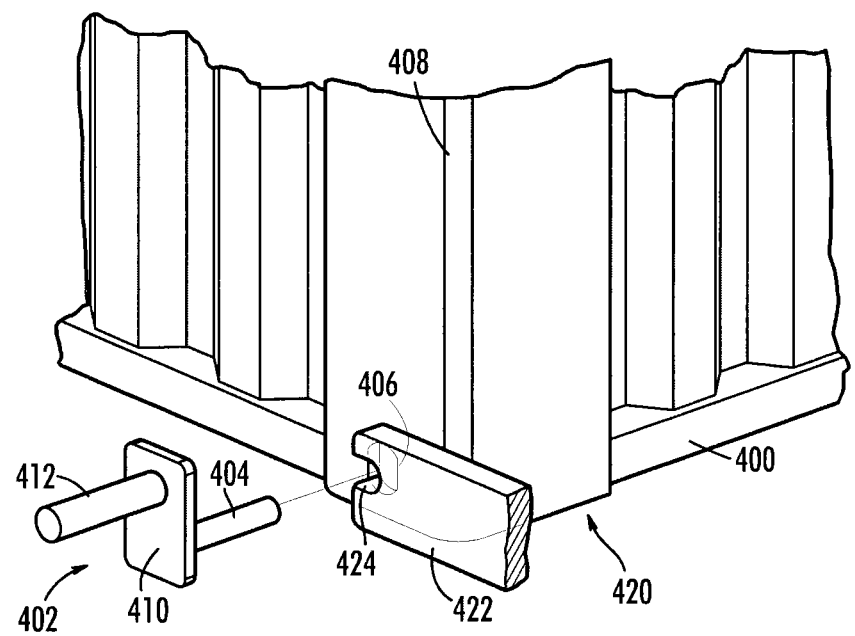
FIG. 11 illustrates an alternate embodiment of a securement for the lower portion of a container, particularly one that rests on the ground, according to an embodiment of the invention.

FIG. 11 illustrates an alternative securement for the lower portion of a container 400. In this embodiment an adaptor 402 with a pin 404 is inserted into the hole 406 in the lower left and right corners 408 (lower right corner not shown). Pin 404 is carried on a plate 410 that may be at least one foot and preferably 18 inches high. The opposing side of plate 410 has a pin 412 that extends away from container 400 and will serve as a handle for lifting container 400. Pin 412 is mounted toward the upper end of plate 410 and pin 404 is located toward the bottom of plate 410.

The vertical frame 420 (only a portion of which is shown in FIG. 11) has an extension 422 on each side (only the extension on the left side is shown in FIG. 11) that are just lateral to container 400 when container 400 is centered between left and right extensions 422. Extensions 422 have a notch 424 dimensioned to receive pin 412. As either the mobile unit moves toward the back end of trailer 400 or the tractor backs toward the front end of trainer 400, extensions 422 eclipse the sides of the container 400 and seat pins 404 into notches 424 thus holding plates 410 to the sides of container 400 and pins 404 in the holes 406 of container 400 and also gripping container for lifting.

Figure 12A:
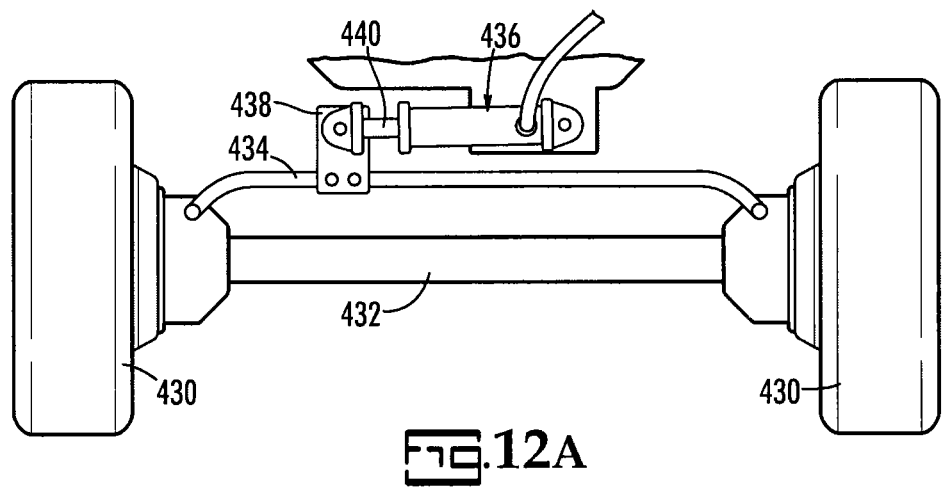
FIGS. 12A and 12B illustrate an alternate embodiment of a steering mechanism for a mobile unit for turning the wheels, according to an embodiment of the invention.
Figure 12B:
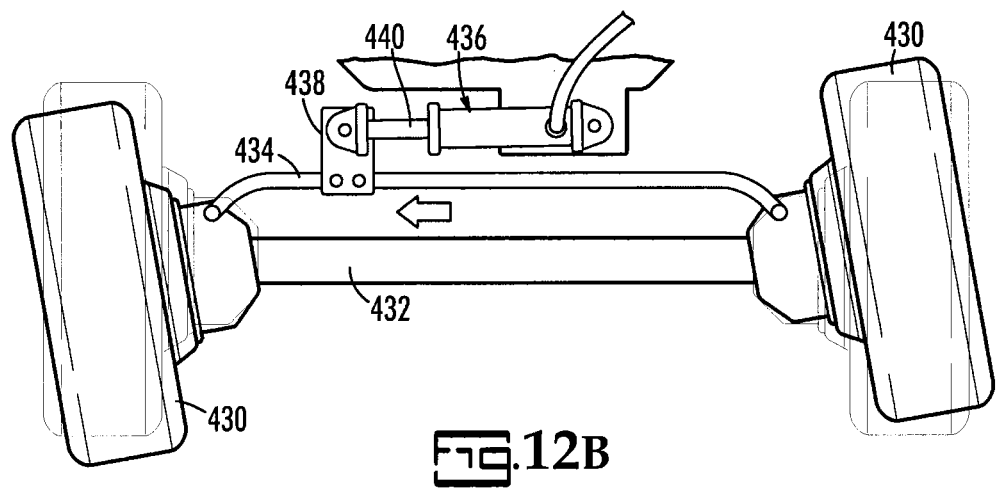

FIGS. 12A and 12B illustrate an alternative steering arrangement. In FIGS. 12A and 12B, a set of wheels 430 of the dual wheel carriage of the mobile unit is made to be steerable. Wheels 430 are pivotally attached to axle 432 and to a tie rod 434. An air cylinder 436 is mounted in parallel to tie rod 434 and connected by a link 438 so that the movement of the rod 440 is transferred via link 438 to movement of tie rod 434 and thus causes pivoting of both wheels. Only a small amount of movement of wheels is needed to enable them to cause the mobile unit to change direction.

Those skilled in the art of hauling shipping containers will appreciate that likely many modifications and substitutions can be made to the foregoing embodiments of the present invention without departing from the spirit and scope of the present invention, which is defined by the appended claims.

What is claimed is:

1. A system for transporting a shipping container, said shipping container having a first end and an opposing second end, the system comprising:
   (a) a first support assembly having
      (i) a horizontal frame,
      (ii) a vertical frame,
      (iii) a main cylinder pivotally connect to said horizontal frame and said vertical frame, said main cylinder adapted to move between a retracted position and an extended position, said main cylinder moving said vertical frame with respect to said horizontal frame when moving between said retracted position and said extended position,
      (iv) locking assemblies carried by said vertical frame for securing said first end of the container to said vertical frame,
      (v) wheels supporting said horizontal frame and in operating connection therewith,
      (vi) an engine supported by said horizontal frame and in operating connection with said wheels and said main cylinder so that said engine can rotate said wheels and thereby move said first support assembly, and said engine can move said main cylinder from said retracted position to said extended position, and
      (vii) controls carried by said horizontal frame and in operating connection with said engine, said wheels and said main cylinder responsive to said controls so that a user of said controls can control movement of said first support assembly and said main cylinder;
   (b) a second support assembly having
      (i) a horizontal frame,
      (ii) a vertical frame,
      (iii) a main cylinder pivotally connect to said horizontal frame and said vertical frame, said main cylinder adapted to move between a retracted position and an extended position, said main cylinder moving said vertical frame with respect to said horizontal frame when moving between said retracted position and said extended position, said main cylinder of said second support assembly being in operating connection with said engine of said first support assembly so that said engine can move said main cylinder of said second support assembly between retracted and said extended positions,
- (iv) locking assemblies carried by said vertical frame for securing said second end of said container to said vertical frame,
- (v) wheels supporting said horizontal frame and in operating connection therewith, wherein, when said locking assemblies of said first support assembly secure said first end of said container and said locking assemblies of said second support assembly secure said second end of said container and said engine moves said main cylinders of said first and second support assemblies from said retracted positions to said extended positions, said container is lifted, and, when said engine then causes said wheels of said first support assembly to rotate, said first and said second support assemblies move said container.

2. The system as recited in claim 1, wherein said first support assembly is a tractor.

3. The system as recited in claim 1, wherein said first support assembly further comprises drive wheels carried by said horizontal frame and movable between an engaged position against said wheels and a disengaged position away from said wheels, said engine being in operative connection with said drive wheels to cause said drive wheels to move between said engaged position and said disengaged position and to rotate, said wheels rotating in response to rotation of said drive wheels to thereby move said container.

4. The system as recited in claim 1, wherein said first support assembly further comprises a castor wheel carried by said horizontal frame, said castor wheel being in operational connection with said engine and said controls, said castor wheel being pivotable left and right about a vertical axis, said castor wheel having a ground-engaging position and an elevated position, said engine being in operative connection with said castor wheel and causing said castor wheel to pivot left and right and to move between said ground-engaging and said elevated positions, said controls enabling a user to steer said first support assembly by moving said castor wheel to said ground-engaging position and pivoting said castor wheel left and right.

5. The system as recited in claim 1, wherein said first support assembly further comprises at least one locking arm pivotally and telescopingly connected between said horizontal frame and said vertical frame of said first support assembly, said locking arm telescoping when said main cylinder of said first support assembly moves from said retracted position to said extended position, said locking arm being lockable in said extended position.

6. The system as recited in claim 1, wherein said second support assembly further comprises at least one locking arm pivotally and telescopingly connected between said horizontal frame and said vertical frame of said second support assembly, said locking arm telescoping when said main cylinder of said second support assembly moves from said retracted position to said extended position, said locking arm being lockable in said extended position.

7. The system as recited in claim 1, wherein said vertical frame of said first support assembly carries first and second guides, said first and second guides being dimensioned to be wider than said first end of said container so that, when said vertical frame of said first support assembly is being positioned for attachment to said first end of said container, said first and second guides of said first support assembly guide said first end of said container into position with respect to said first support assembly.

8. The system as recited in claim 1, wherein said vertical frame of said second support assembly carries first and second guides, said first and second guides being dimensioned to be wider than said second end of said container so that, when said vertical frame of said second support assembly is being positioned for attachment to said second end of said container, said first and second guides of said second support assembly guide said second end of said container into position with respect to said second support assembly.

9. The system as recited in claim 1, wherein said locking assemblies of said first support assembly further comprise four locks, one lock of said four locks of said first support assembly locking one corner of said vertical frame of said first support assembly to one corner of said first end of said container.

10. The system as recited in claim 9, wherein two locks of said four locks of said second support assembly are pneumatic locks.

11. The system as recited in claim 1, wherein said locking assemblies of said second support assembly further comprise four locks, one lock of said four locks of said second support assembly locking one corner of said vertical frame of said second support assembly to one corner of said second end of said container.

12. The system as recited in claim 1, wherein said locking assemblies of said tractor and said support assembly each further comprise four locks, one lock of said four locks of said tractor locking a corner of said vertical frame of said tractor to one corner of said first end of said container, and one lock of said four locks of said support assembly locking said vertical frame of said support assembly to one corner of said second end of said container.

13. A system for transporting a shipping container, said shipping container having a first end and an opposing second end, said system comprising:
- (a) a tractor having
  - (i) a horizontal frame,
  - (ii) wheels supporting said horizontal frame and in operating connection therewith,
  - (ii) an engine supported by said horizontal frame and in operating connection with said wheels so that said engine can rotate said wheels and thereby move said tractor,
  - (iv) controls carried by said horizontal frame and in operating connection with said engine and said wheels, said engine and said wheels being responsive to said controls so that a user can control movement of said first support assembly;
  - (v) a vertical frame,
  - (vi) a main cylinder pivotally connected to said horizontal frame and said vertical frame, said main cylinder adapted to move between a retracted position and an extended position, said main cylinder moving said vertical frame with respect to said horizontal frame when moving between said retracted position and said extended position,
  - (vii) locking assemblies carried by said vertical frame for securing said first end of said container to said vertical frame,
- (b) a support assembly having
  - (i) a horizontal frame,
  - (ii) a vertical frame, (iii) a main cylinder pivotally connect to said horizontal frame and said vertical frame, said main cylinder adapted to move between a retracted position and an extended position, said main cylinder moving said vertical frame with respect to said horizontal frame when moving between said retracted position and said extended position, (iv) locking assemblies carried by said vertical frame for securing said second end of said container to said vertical frame of said support assembly, (v) wheels supporting said horizontal frame and in operating connection therewith so that said wheels rotate freely, wherein, when said locking assemblies of said vertical frame of said tractor secure said first end of said container to said tractor and said locking assemblies of said vertical frame of said support assembly secure said second end of said container to said support assembly, and said main cylinders of said tractor and support assembly move from said retracted positions to said extended positions, said container is lifted, and, when said engine then causes said wheels of said tractor to rotate, said tractor and said support assembly move said container.

14. The system as recited in claim 13, wherein said engine of said tractor includes an air pump, and wherein said air pump is in operational connection with said main cylinders of said tractor and said support assembly to move said main cylinders from said retracted positions to said extended positions to lift said container.

15. The system as recited in claim 13, wherein said support assembly further comprises an engine and an air pump in operational connection with said engine and said main cylinder of said support assembly, and wherein said tractor further comprises an air pump in operational connection with said engine and said main cylinder of said tractor, and wherein, when said air pump of said tractor moves said main cylinder of said tractor from said retracted position to said extended position and said air pump of said support assembly moves said cylinder of said support assembly from said retracted position to said extended position, said container is lifted.

16. The system as recited in claim 13, wherein said engine of said tractor includes an air pump, said air pump being in operational connection with said main cylinder of said tractor and said main cylinder of said support assembly to supply air thereto so that said main cylinders of said tractor and said support assembly are movable from said retracted positions to said extended positions to lift said container.

17. The system as recited in claim 16, wherein said support assembly further comprises drive wheels carried by said horizontal frame and movable between an engaged position against said wheels and a disengaged position away from said wheels, said engine being in operative connection with said drive wheels and thereby causing said drive wheels to move between said engaged position and said disengaged position and to rotate so that, when said drive wheels are in said engaged position, said drive wheels rotate said wheels to move said support assembly into position with respect to said container.

18. The system as recited in claim 16, wherein said support assembly further comprises a castor wheel carried by the horizontal frame and pivotable left and right about a vertical axis, the castor wheel having a ground-engaging position and an elevated position, the engine being in operative connection with the castor wheel and causing the castor wheel to pivot left and right and to move between the ground-engaging and the elevated positions, the controls enabling a user to steer said support assembly by moving said castor wheel to said ground-engaging position and pivoting said castor wheel left and right.

19. The system as recited in claim 13, wherein said support assembly further comprises at least one locking arm pivotally connected between said horizontal frame and said vertical frame of said support assembly, said locking arm telescoping when said main cylinder of said support assembly moves from said retracted position to said extended position, said locking arm being lockable in said extended position.

20. The system as recited in claim 13, wherein said tractor further comprises at least one locking arm pivotally connected between said horizontal frame and said vertical frame of said tractor, said locking arm telescoping when said main cylinder of said tractor moves from said retracted position to said extended position, said locking arm being lockable in said extended position.

* * * * *